United States Patent
Insley et al.

(10) Patent No.: US 6,743,464 B1
(45) Date of Patent: *Jun. 1, 2004

(54) METHOD OF MAKING ELECTRETS THROUGH VAPOR CONDENSATION

(75) Inventors: Thomas I. Insley, West Lakeland Township, MN (US); Randall L. Knoll, Grant, MN (US)

(73) Assignee: 3M Innovative Properties Company, St. Paul, MN (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/548,892

(22) Filed: Apr. 13, 2000

(51) Int. Cl.⁷ .............................. B03C 3/28; B05D 5/12; B05D 3/02
(52) U.S. Cl. .................. 427/121; 427/58; 427/255.24; 427/372.2; 427/377; 307/400
(58) Field of Search ........................ 427/58, 79, 121, 427/248.1, 255.24, 294, 296, 372.2, 377, 422, 255.11, 255.12; 307/400; 95/58, 59, 60; 96/27, 69

(56) References Cited

U.S. PATENT DOCUMENTS

| | | | |
|---|---|---|---|
| 3,971,373 A | | 7/1976 | Braun |
| 4,118,531 A | | 10/1978 | Hauser |
| 4,215,682 A | | 8/1980 | Kubik et al. |
| 4,291,244 A | * | 9/1981 | Beach et al. .................. 307/400 |
| 4,291,245 A | * | 9/1981 | Nowlin et al. ............... 307/400 |
| RE30,782 E | | 10/1981 | van Turnhout |
| 4,351,789 A | * | 9/1982 | Sidles et al. ................. 264/130 |
| 4,397,702 A | * | 8/1983 | Klein et al. .................. 156/153 |
| 4,539,256 A | | 9/1985 | Shipman |
| 4,588,537 A | | 5/1986 | Klaase et al. |
| RE32,171 E | | 6/1986 | van Turnhout |
| 4,652,282 A | | 3/1987 | Ohmori et al. |
| 4,685,569 A | * | 8/1987 | Osaki et al. ................. 209/571 |
| 4,789,504 A | | 12/1988 | Ohmori et al. |
| 4,798,850 A | | 1/1989 | Brown |
| 5,057,710 A | | 10/1991 | Nishiura et al. |
| 5,110,620 A | * | 5/1992 | Tani et al. ..................... 427/40 |
| 5,280,406 A | * | 1/1994 | Coufal et al. ................ 361/225 |
| 5,411,576 A | | 5/1995 | Jones et al. |
| 5,496,507 A | * | 3/1996 | Angadjivand et al. ....... 264/423 |
| 5,759,926 A | * | 6/1998 | Pike et al. ................... 442/333 |
| 5,908,598 A | * | 6/1999 | Rousseau et al. ........... 264/344 |
| 5,919,847 A | * | 7/1999 | Rousseau et al. ............. 524/89 |
| 5,976,208 A | * | 11/1999 | Rousseau et al. .......... 55/385.3 |
| 6,172,137 B1 | * | 1/2001 | Agostini et al. ............ 523/212 |

FOREIGN PATENT DOCUMENTS

| | | | |
|---|---|---|---|
| EP | 0829293 A1 | * | 3/1998 |
| JP | 60-947 | | 1/1985 |
| RU | 423483 | | 4/1974 |
| WO | WO 97/07272 | | 2/1997 |
| WO | WO-00/01737 | * | 1/2000 |

OTHER PUBLICATIONS

"Deformation Image Processing", IBM Technical Disclosure Bulletin, Dec., 1961.*

Chudleigh, P. W. "Charging of polymer foils using liquid contacts", Dec., 1972.*

Chudleigh, P.W., *Charging of Polymer Foils Using Liquid Contacts*, Appl. Phys. Lett., vol. 21, No. 11, Dec. 1, 1972.

Chudleigh, P.W., *Mechanism of Charge Transfer to a Polymer Surface by a Conducting Liquid Contact*, Journal of Applied Physics, vol. 47, No. 10, Oct. 1976.

Wente, Van A., *Superfine Thermoplastic Fibers*, Indus. Eng. Chemistry, vol. 48, pp. 1342–1346 (Aug. 1956).

* cited by examiner

*Primary Examiner*—Shrive P. Beck
*Assistant Examiner*—Wesley D Markham
(74) *Attorney, Agent, or Firm*—Karl G. Hanson; Allison Johnson

(57) ABSTRACT

A method of making an electret includes condensing vapor from the atmosphere of a controlled environment onto a dielectric article and then drying the article to remove the condensate. The dielectric article may be a nonconductive polymeric material, and the condensate may include a polar liquid. The method is particularly useful for forming an electret from a porous material such as a nonwoven fibrous web. The method can enable individual fibers in the web to exhibit at least quasi-permanent electrical charge.

25 Claims, No Drawings

METHOD OF MAKING ELECTRETS THROUGH VAPOR CONDENSATION

BACKGROUND

The invention pertains to a method of making an electret article by condensing vapor onto a dielectric article followed by drying.

Electrets are dielectric articles that exhibit a lasting charge. This unique property allows electrets to be used in a variety of applications including air, furnace, and respiratory filters, face masks, and electro-acoustic devices such as microphones, headphones, and electrostatic recorders. The charged nature of the electret enhances the article's ability to attract and retain particles such as dust, dirt, and fibers that are suspended in the air.

A variety of methods have been developed for producing electrets. The methods include contact electrification, thermal charging, charge-deposition, liquid contact charging, and impinging jets of water on the surface of the article. Examples of these methods are disclosed in the following documents: P. W. Chudleigh, *Mechanism of Charge Transfer to a Polymer Surface by a Conducting Liquid Contact*, 21 APPL. PHYS. LETT., 547–48 (Dec. 1, 1972); P. W. Cudleigh, *Charging of Polymer Foils Using Liquid Contacts*, 47 J. APPL. PHYS., 4475–83 (October 1976); U.S. Pat. No. 4,215,682 to Kubic and Davis; U.S. Pat. No. 4,588,537 to Klaase et al.; U.S. Pat. Nos. Re. 30,782, Re. 31,285, and Re. 32,171 to van Turnhout; U.S. Pat. No. 4,798,850 to Brown; U.S. Pat. No. 5,280,406, Coufal et al.; and U.S. Pat. No. 5,496,507 to Angadjivand et al.

SUMMARY OF THE INVENTION

The present invention provides a new method of making an electret that involves condensing a vapor onto a dielectric article followed by drying.

In one aspect, the invention features a method of making an electret that may suitably comprise or consist essentially of: condensing vapor from the atmosphere of a controlled environment onto an article that includes a nonconductive polymeric material; and drying the article to remove the condensate. In other aspects, the invention features a filter or respirator that includes an electret produced according to the method of this invention.

The method is particularly useful for forming an electret from a porous material such as a nonwoven fibrous web. The method can enable individual fibers in the web to exhibit at least quasi-permanent electrical charge. The method may advantageously be used to form an electret without altering the physical structure of the polymer article. That is, the process can be employed without damaging, for example, breaking or eroding, the individual fibers or the bulk structure of the article, or unduly compressing a porous fibrous web. The method also may be suitable for charging articles that have a variety of shapes and constructions including, for example, articles that exhibit a contoured shape, multi-layer articles, flat articles and combinations thereof. The inventive method is also advantageous in that less liquid may be used to charge the article. Although electret articles can be produced in this invention through saturation with the condensate, the invention does allow electrets to be produced without complete saturation, and thus allows less liquid to be used to charge an electret.

Also, the liquid used in the method can be water, which is not an environmental pollutant, is readily available, and has a relatively low cost.

GLOSSARY

In reference to the invention, these terms have the meanings set forth below:

"atmosphere" means a gaseous medium;

"condensate" means the product that results from condensing;

"condensing" means altering to another and denser form, e.g., reducing gas or vapor to a liquid;

"controlled environment" means a surrounding whose volume, pressure, temperature, or a combination thereof, can be regulated and/or altered in a predetermined manner;

"dielectric material" means a material in which an electric field gives rise to no net flow of electric charge but only to a displacement of charge;

"drying" means removing condensate from the surface of the article;

"electret" means a dielectric material that exhibits at least a quasi-permanent electrical charge;

"nonconductive" means having a volume resistivity of greater than $10^{14}$ ohm-cm;

"persistent electric charge" means that the electric charge resides in the article for at least the commonly-accepted useful life of the device in which the electret is employed;

"polymeric" means containing a polymer and possibly other ingredients;

"quasi-permanent" means that the electric charge resides in the electret under standard atmospheric conditions (22° C., 101,300 Pascals atmospheric pressure, and 50% humidity) for a time period long enough to be significantly measurable; and "vapor" means a gaseous system such as air, which contains molecules that can be condensed to form a liquid.

DETAILED DESCRIPTION OF PREFERRED EMBODIMENTS OF THE INVENTION

An electret can be prepared according to the invention, for example, by placing an article in a controlled environment, altering at least one property of the environment such that the atmosphere surrounding the article becomes saturated with vapor, altering the same or different property of the environment such that the vapor condenses on the article, and then drying the article. The properties of the environment that may be altered to condense the vapor include pressure, volume, and temperature.

In one embodiment, an electret may be prepared by altering the pressure of the atmosphere in a controlled environment that includes the atmosphere and a liquid. An article is submerged in the liquid in the controlled environment. Although submerged, there is an atmosphere of gas, vapor, or a combination thereof, around the article. For those articles that include interstitial spacing, the atmosphere permeates throughout the interstices. The method may further include reducing the pressure (P) on the atmosphere, for example, to a pressure P1, to allow at least a portion of the liquid to evaporate into the atmosphere to increase the vapor present in the atmosphere. The pressure may be further reduced to pressure P2 to the vapor pressure of the liquid, to cause the liquid to boil. The resulting vapor displaces the gas molecules in the atmosphere. The pressure may then be increased to ambient pressure to cause the vapor to condense on the surface of the article, including, when present, the surfaces that define the interstitial spaces of the article, so as to wet the article surface. The article is then dried to create an electret.

An electret also may be prepared by (i) placing the article in a controlled environment that includes a vapor-saturated volume and (ii) increasing the pressure on the volume to cause the vapor to condense on the article. The pressure can be increased by placing the article in a sealed chamber that has a first sealed volume V1 and reducing the volume of the chamber to a second sealed volume V2 such that at least a portion of the vapor condenses from the sealed chamber's atmosphere onto the article. The reduction in sealed volume can be accomplished, for example, through the actuation of a piston that reduces the sealed volume of the chamber without releasing the atmosphere.

In other embodiments, an electret may be prepared by: (i) placing an article in a controlled environment that is saturated with vapor; (ii) rapidly decreasing the pressure, to cause an adiabatic expansion to occur, which, in turn, causes vapor to condense on the surface of the article; and (iii) drying the article.

In yet another embodiment, the electret may be prepared by (i) placing an article in a controlled environment that includes a vapor-saturated atmosphere, which article has been conditioned at a temperature T1 and the controlled environment is conditioned at a temperature T2 (the saturation temperature), where T1 is sufficiently less than T2 so as to cause the vapor to condense on the article, and then (ii) drying the article.

The controlled environment in which the electret may be produced is one where the properties of the environment—such as volume, temperature, pressure and combinations thereof—are capable of being regulated and/or altered in a predetermined manner. One example of a controlled environment includes a chamber that is capable of being sealed to the atmosphere surrounding the chamber, which, in turn, provides a sealed interior atmosphere within the chamber. The chamber may include a source of liquid, vapor, or a combination thereof, and may include a device for adding the liquid or vapor to the chamber or removing the liquid or vapor from the chamber. The chamber also may be in communication with a vacuum to reduce the pressure in the chamber. Alternately, a source of fluid, for example, a gas, liquid or a combination thereof, may be in communication with the chamber to provide additional fluid to the system, which may then be used to increase the pressure in the chamber. A heat source can be attached to the chamber to alter the temperature of the chamber, the liquid or the vapor in the chamber, and combinations thereof The chamber may also include movable walls that can move to increase or decrease the volume of space within the chamber to alter the pressure on the system.

The method may be continuous such that the charge imparting liquid is recycled through the system for repeated use in the charging process. The liquid may be captured as it is removed from the article, in for example, the drying step, so that it is available for subsequent charging processes.

A variety of methods can be used to dry the article. Drying can occur through use of active drying mechanisms such as a heat source, a flow-through oven, a vacuum source, a stream of drying gas (convection), and a mechanical apparatus like a centrifuge. A pressure change can also be used to create a phase change in the condensate to have it enter the gas phase by evaporation. A useful passive drying mechanism includes allowing the condensate to evaporate through air drying. Combinations of these techniques may also be used.

Useful condensate liquids are those liquids that are capable of imparting a charge to the article. Preferably the condensate is a dielectric fluid that is polar—that is, it exhibits a dipole moment. Examples of particularly useful liquids include: water; liquid carbon dioxide; organic liquids such as acetone, methanol, ethanol, butanol, propanol, and ethylene glycol; chlorofluorocarbons such as chlorodifluoromethane, fluorocarbons, e.g., Freon® (i.e., tetrafluorocarbon); dimethyl sulfoxide; dimethyl formamide; acetonitrile; and combinations thereof. The method is also well suited to making electrets using liquids that are nonwetting with respect to the article of the electret.

The inventive method may be useful for charging a variety of dielectric articles. Examples of electret articles include films such as porous films disclosed in U.S. Pat. No. 4,539,256; nonwoven webs, such as described in U.S. Pat. No. 5,976,208; microstructured articles, e.g., films that include layered structures having very small open passageways, see, for example, pending application U.S. Ser. No. 09/106,506 entitled, "Structured Surface Filtration Media" (Insley et al.) filed Jun. 18, 1998; and foams and sponges. The dielectric articles may be made from materials such as glass, rubber, elastomers, cellulosics, and nonconductive polymeric articles. For applications in which the electret is used as a filter, it preferably comprises a nonconductive polymeric material.

The method is particularly useful for making electrets from nonwoven polymeric fibrous webs that include fibers such as microfibers (for example, melt-blown microfibers), staple fibers, fibrillated films, and combinations thereof. The fibers can be formed from polymers. The polymer used to form the fibers typically are substantially free of materials such as antistatic agents that could increase the electrical conductivity or otherwise interfere with the ability of the fibers to accept and hold electrostatic charges.

Preferred polymers are thermoplastic and are nonconductive. Suitable polymers include, for example, thermoplastic nonconductive polymers that are capable of retaining a high quantity of trapped charge and are capable of being formed into fibers. Examples of useful thermoplastic polymers include polyolefins such as, e.g., polypropylene, polyethylene, poly-(4-methyl-1-pentene), blends or copolymers containing one or more of these polymers, and combinations thereof, halogenated vinyl polymers (e.g., polyvinyl chloride), polystyrene, polycarbonates, polyesters, polyethylene terephthalate, flouropolymers, and combinations thereof One example of a useful fluoropolymer is polytetrafluoroethylene.

The articles can also include fluorochemical additives such as the additives described in U.S. Pat. No. 5,099,026 and U.S. Pat. No. 5,025,052 to Crater et al., U.S. Pat. No. 5,411,576 to Jones et al., and U.S. Pat. No. 6,002,017 to Rousseau et al.

Other additives can be blended with the resin including, e.g., pigment, UV stabilizers, antioxidants, and combinations thereof.

Meltblown microfibers can be prepared as described in Wente, Van A, *Superfine Thermoplastic Fibers*, INDUS. ENG. CHEMISTY, Vol. 48, pp. 1342–1346 and in Report No. 4364 of the Naval Research laboratories, published May 25, 1954, entitled, *Manufacture of Super Fine Organic Fibers*, by Wente et al. Meltblown microfibers preferably have an effective fiber diameter of from about 1 to 50 micrometers ($\mu$m) as calculated according to the method set forth in Davies, C. N., "The Separation of Airborne Dust and Particles," Institution of Mechanical Engineers, London, Proceedings 1B, 1952. For filtration purposes, the fibers preferably have an effective fiber diameter of from about 2 to 15 µm.

The presence of staple fibers provides a more lofty, less dense web than a web constructed solely of meltblown microfibers. Some useful electrets include more than 70% by weight staple fibers. Webs that contain staple fibers are disclosed in U.S. Pat. No. 4,118,531 to Hauser.

Electrets that include a nonwoven polymeric fibrous web that is used for filtration applications particularly in respirators, preferably have a basis weight in the range of about 10 to 500 g/m$^2$, more preferably about 10 to 100 g/m$^2$.

The nonwoven polymeric electrets can also include particulate matter as disclosed, for example, in U.S. Pat. No. 3,971,373 to Braun, U.S. Pat. No. 4,100,324 to Anderson, and U.S. Pat. No. 4,429,001 to Kolpin et al. The particulate matter may be useful for removing noxious vapors from air.

The charge-imparting liquid, the article, and other components used in the method can be selected to produce an electret having desired properties such that it is suitable for a predetermined use. The method is particularly well-suited for imparting electret properties to nonwovens and for enhancing the filtering performance of nonwovens. One measure of filtering performance is particle capture efficiency—that is, the ability of an article to capture particles. Preferably the charged article exhibits greater particle capture efficiency relative to an uncharged article. More preferably, the particle capture efficiency of the charged article is enhanced by at least about 10%, most preferably by at least about 20%, relative to the particle capture efficiency of the same uncharged article.

One measure of filtering performance is obtained from the dioctylphthalate ("DOP") initial penetration test ("the DOP test"). The DOP test also provides a relative measure of the charge state of the filter. The DOP test procedure involves forcing DOP aerosol at a face velocity of 3.9 cm/second, measuring the pressure drop across the sample (Pressure Drop measured in mmH$_2$O) with a differential manometer, and measuring the percent DOP penetration (DOPPen %). Preferably the DOPPen % of the uncharged filter is greater than the DOPPen % of the charged filter.

Electrets that are prepared according to the inventive method are suitable for use in a variety of applications including, for example: electrostatic elements in electro-acoustic devices such as microphones, headphones and speakers; electrostatic recorders; filtering devices such as air filters for heating, ventilation, and air conditioning applications, and respiratory filters such as face masks and respirators that are designed to fit at least over the nose and mouth of a person and that may use prefilters, canisters and replaceable cartridges or may possess a porous filtering mask body—see for example, U.S. Pat. No. 4,536,440 to Berg, U.S. Pat. No. 4,807,619 to Dyrud et al., U.S. Pat. No. 4,883,547 to Japuntich, U.S. Pat. No. 5,307,796 to Kronzer et al., U.S. Pat. No. 5,374,458 to Burgio, U.S. Pat. No. Re. 35,062 to Brostrom et al., and U.S. Pat. No. 5,062,421 to Burns and Reischel.

EXAMPLES

Test procedures used in the examples include the following.

DOP Penetration and Pressure Drop Test

The DOP Penetration and Pressure Drop Test are performed by forcing an aerosol of dioctyl phthalate (DOP) particles through a 11.45 cm (4.5 inches) diameter sample of nonwoven web at a rate of 70 liters/minute for a period of 30 seconds. The face velocity on the sample is 3.9 centimeters per second. The DOP particles have a median diameter of 0.3 mm and are generated using a TSI No. 212 sprayer (available from TSI of St. Paul, Minn.) with four orifices and 207 kilo pascals (kPa)(30 psi) of clean air at a concentration of between about 70 and about 110 milligrams per cubic meter (mg/m$^3$).

The penetration of DOP particles through the sample is measured with an optical scattering chamber, Percent Penetration Meter Model TPA-8F (Air Techniques Inc. of Baltimore, Md.), and reported as % particle penetration. The pressure drop (ΔP) across the sample is measured using an electronic manometer and reported in millimeters of water (mm H$_2$O).

Particle Capture Efficiency Calculation

The particle capture efficiency was calculated according to the following equation:

$$E = 100 - PPM$$

where E is the % particle capture efficiency, and PPM is the % particle penetration measured during the DOP Penetration Test Method.

The relative improvement in the capture efficiency is calculated according to the following equation:

$$REI = (Ec - Eu)/Eu \times 100\%$$

where REI is the % relative efficiency improvement, Ec is the % particle capture efficiency of the charged sample, and Eu is the % particle capture efficiency of the uncharged sample.

Sample Preparation

The nonwoven web was prepared generally as described by Van A. Wente, Industrial and Engineering Chemistry, Vol. 48, pp. 1342–1346 (1956). The extruder was a Berstorff 60 millimeter (mm), 44 to 1, eight barrel zone, co-rotating twin screw extruder. When an additive was incorporated in the resin, it was prepared in a Werner Pfleiderer 30 mm, 36 to 1 co-rotating twin screw extruder.

Example 1

A web—which contained meltblown microfibers and which had a 5 µm effective fiber diameter and a basis weight of about 50 grams per square meter (g/m$^2$)—was placed in a glass vacuum chamber, and the web was submerged in water that had been purified by reverse osmosis and deionized. The microfibers contained polypropylene (Exxon Type 3505G) containing 1% by weight fluorocarbon melt additive that was Additive A, a flouorochemical oxazolidinone described in U.S. Pat. No. 5,472,481. The deionized water had a resistivity of about 10.0 Megaohm-centimeters (MOhms-cm) at 25° C. After the web was submerged in the deionized water, the chamber was sealed, and the pressure above the deionized water was reduced to about 2.67 kilo Pascals (kPa) by pulling a vacuum on the vacuum chamber. The vacuum chamber was allowed to equilibrate for approximately 10 minutes, and then the vacuum was released, which caused the water vapor present in the vacuum chamber to condense on the web such that the web became saturated with condensing water vapor. The saturated web was then removed from the chamber, was placed in a holder having a mesh bottom, and was centrifuged at about 1,000 gravities for one minute to extract excess liquid. The sample was then air dried for about 20 hours.

Example 2

A microfiber web was prepared and treated as described above with respect to Example 1 with the exception that the fluorochemical melt additive was 0.5% by weight Chimassorb 944 hindered amine light stabilizer (Ciba-Geigy).

Example 3

A 200 g/m² thermally-bonded air laid web was prepared as described in U.S. Pat. No. 4,813,948 to Insley to include 50% by weight polypropylene (Fina EOD 9418 400 MFI) microfibers having 5 to 10 μm effective fiber diameter, 25% by weight 15 denier polyethylene terephthalate (PET) staple fibers, and 25% by weight 5 denier thermal bonding bi-component staple fibers.

The air laid web was then treated according to the charging method of Example 1.

The webs of Examples 1–3 were tested according to the DOP Penetration Test Method. The Particle Capture Efficiency of each web was calculated. The results are reported in Table 1.

Comparative Examples C1–C3

The uncharged webs used in Examples 1–3 were tested according to the DOP Penetration Test Method. The Particle Capture Efficiency of each web was calculated. The results are reported in Table 1.

TABLE 1

| Example | Particle Penetration (%) | Pressure Drop (mmH$_2$O) | Capture Efficiency (%) | Relative Efficiency Improvement (%) |
|---------|--------------------------|--------------------------|------------------------|--------------------------------------|
| 1       | 42                       | 1.7                      | 58                     | 76                                   |
| C1      | 67                       | 1.7                      | 33                     | NA                                   |
| 2       | 5                        | 1.6                      | 95                     | 217                                  |
| C2      | 70                       | 1.6                      | 30                     | NA                                   |
| 3       | 39                       | 0.4                      | 61                     | 33                                   |
| C3      | 54                       | 0.4                      | 46                     | NA                                   |

NA = not applicable

The inventive method is not limited to the above-described processes. For example, the inventive method could also include a process that involves the selective charging of a portion of an article. Selective charging can be achieved, for example, by applying a mask to an area of an article such that the masked area is not exposed to a condensing vapor, condensing a vapor onto the exposed area, and then drying the article. The mask can be physical or thermal—for example, the temperature of an area of the article can be maintained such that it does not receive a condensing vapor. The mask can be used to produce an article having randomly charged areas or a pattern of charged areas, e.g., one or more zones. A pattern charged article can be selectively impregnated with components such as particles that are electrostatically drawn to the selectively charged area(s).

All patents and patent applications cited in this document, including those cited in the Background, are incorporated by reference in total.

This invention may be suitably practiced in the absence of any element not explicitly described in this document.

What is claimed is:

1. A method of making an electret comprising:
    altering at least one property of a controlled environment so as to cause the vapor of the atmosphere of the controlled environment to condense on a dielectric article having a resistivity of greater than $10^{14}$ ohms-cm, said property being selected from the group consisting of volume, pressure or temperature of the controlled environment; and
    drying the article.

2. The method of claim 1, wherein the controlled environment further comprises a liquid, and the method further comprises:
    placing the article in the liquid; and
    decreasing the pressure on the atmosphere such that at least a portion of the liquid evaporates into the atmosphere.

3. The method of claim 1, wherein altering the property comprises increasing the pressure on the atmosphere such that the vapor condenses on the article.

4. The method of claim 1, wherein said altering comprises an adiabatic expansion.

5. A method of making an electret, which method comprises:
    placing a dielectric article in a liquid of a controlled environment;
    condensing vapor from the atmosphere of the controlled environment onto the dielectric article to form a condensate thereon;
    decreasing the pressure on the atmosphere of the controlled environment such that at least a portion of the liquid evaporates into the atmosphere; and then
    drying the article.

6. The method of claim 5, wherein the electret exhibits a persistent electric charge.

7. The method of claim 5, wherein the dielectric article comprises a nonconductive polymeric material.

8. The method of claim 5, wherein the condensate that forms when the vapor condenses on the dielectric article includes a polar liquid.

9. The method of claim 8, wherein the polar liquid is an aqueous liquid.

10. The method of claim 8, wherein the condensate consists essentially of water.

11. The method of claim 8, wherein the condensate is selected form the group consisting of acetone, methanol, ethanol, liquid carbon dioxide, butanol, or a combination thereof.

12. The method of claim 8, wherein the condensate comprises a fluorocarbon.

13. The method of claim 8, wherein the article is nonwoven fibrous web.

14. The method of claim 13, wherein the nonwoven fibrous web comprises microfibers.

15. The method of claim 14, wherein the microfibers are melt blown.

16. The method of claim 15, wherein the melt blown microfibers comprise polypropylene, poly-(4methyl-1-pentene), or a combination thereof.

17. The method of claim 5, wherein the controlled environment comprises a vacuum chamber.

18. A method of making an electret, which method comprises:
    altering a first property of a controlled environment comprising atmosphere and liquid such that at least a portion of the liquid evaporates into the atmosphere to form vapor;

altering a second property of the environment such that the vapor condenses on the surface of a dielectric article; and then drying the article.

19. The method of claim 18, wherein the first property is selected from the group consisting of pressure, volume or temperature, or a combination thereof, and wherein the second property is selected from the group consisting of pressure, volume or temperature or a combination thereof.

20. The method of claim 19, wherein the first property comprises pressure and the second property comprises pressure.

21. The method of claim 19, wherein the first property comprises volume and the second property comprises volume.

22. A method of making an electret, which method comprises:

condensing vapor from the atmosphere of a controlled environment onto a dielectric article to form a condensate thereon, said condensing comprising increasing the pressure on the atmosphere of the controlled environment such that the vapor condenses on the article; and then drying the article.

23. A method of making an electret, which method comprises:

condensing vapor from the atmosphere of a controlled environment onto a dielectric article by an adiabatic expansion to form a condensate on the dielectric article; and then drying the article.

24. A method of making an electret, which method comprises:

altering the volume of a controlled environment that comprises atmosphere and liquid such that at least a portion of the liquid evaporates into the atmosphere to form vapor;

altering the volume of the environment such that the vapor condenses on the surface of a dielectric article; and then drying the article.

25. A method of mating an electret comprising:

altering a first property of a controlled environment of a chamber such that at least a portion of a liquid in the controlled environment evaporates into the atmosphere;

altering at least one second property of the controlled environment so as to cause vapor of the atmosphere of the controlled environment to condense on a dielectric article having a resistivity of greater than $10^{14}$ ohms-cm, said dielectric article being disposed in said controlled environment; and drying the article to remove the condensate, wherein the electret exhibits a persistent electric charge.

* * * * *

UNITED STATES PATENT AND TRADEMARK OFFICE
CERTIFICATE OF CORRECTION

PATENT NO. : 6,743,464 B1
DATED : June 1, 2004
INVENTOR(S) : Insley, Thomas I.

It is certified that error appears in the above-identified patent and that said Letters Patent is hereby corrected as shown below:

<u>Column 8,</u>
Line 46, delete "form" and insert therefore -- from --.
Lines 58-59, "(4methyl-1-pentene)" should read as -- (4-methyl-1-pentene) --.

<u>Column 10,</u>
Line 12, delete "mating" and insert therefore -- making --.

Signed and Sealed this

Sixteenth Day of November, 2004

JON W. DUDAS
*Director of the United States Patent and Trademark Office*